Patented Jan. 6, 1942

2,269,377

UNITED STATES PATENT OFFICE 2,269,377

COMPOSITION OF UNVULCANIZED CREPE RUBBER

Morris Omansky, Brookline, Mass., assignor to Monsanto Chemical Company, St. Louis, Mo., a corporation of Delaware No Drawing. Application November 23, 1938, Serial No. 242,043

1 Claim. (Cl. 260—765)

This invention relates to improvements in the manufacture of unvulcanized crepe rubber compositions and the product so obtained.

Crepe rubber in its unvulcanized condition finds its principal outlet in soles for shoes. In the preparation of soling for this purpose it is now customary either to import unmilled, unvulcanized crepe rubber which is prepared at the plantations by special processing specifically for soling, and merely cut this to the desired size, or to import the much less expensive ordinary unmilled, unvulcanized pale crepe rubber, which is then put through a milling step to give it the desired characteristics of thickness and creping, and also to incorporate coloring matter, if desired. The milled product from the latter source is then cut to size, and attached to the shoe as an outsole, by a procedure, such as for example, cementing to a suitably prepared rubber midsole.

The milling step affects undesirably the properties of the unvulcanized crepe rubber, making it softer, more tacky, and less resistant to wear and to stretch than the original unvulcanized rubber of either the special soling type or the ordinary type. For this reason, milling is always kept at a minimum, but it can not be eliminated. The deleterious effects of milling are more pronounced in the preparation of colored unvulcanized crepe soling, as more milling is required to incorporate the coloring matter homogeneously than when no color is added.

While numerous attempts have been made to overcome or counteract these effects of milling, so far as I am aware none of these have met with any appreciable commercial success.

It is, therefore, an object of the present invention to counteract to a controllable degree the effects of milling upon the ordinary unvulcanized crepe rubber, and thus to provide an improved milled unvulcanized crepe rubber product suitable for conventional purposes such as soling.

Another object is to provide a procedure for making a milled unvulcanized crepe rubber whereby such rubber has a greater hardness, stiffness, strength, dryness, and resistance to stretch, wear and indentation, and also has a lesser adhesiveness, than has conventional unvulcanized rubber of this type, while still retaining its translucency even in thick sheets.

Another object is to provide a procedure for so controlling the said properties of hardness, stiffness, etc. that the product may have these properties to a degree greater than, substantially equal to, or less than, those of the unmilled crepe as received from the plantation.

Another object is to permit a wider latitude in the degree or amount of milling, while retaining the advantageous characteristics of the product.

Other objects will be evident from the following disclosure.

Briefly stated, the present invention is carried out by the incorporation of a suitable amount of silica aerogel having a high percentage of voids, as hereinafter described, with unmilled unvulcanized crepe rubber. This incorporation is performed by a milling step, and results in a milled unvulcanized product having greater hardness, stiffness, strength, and other desirable qualities set forth above, than the product would have if made the same way but without silica aerogel. The amount of silica aerogel may be varied within a considerable range, depending upon the characteristics desired in the final product, as will be pointed out more fully hereinafter. If a colored product is desired, the usual organic pigments may be used. These may be added in the milling step with the silica aerogel.

Preparation of silica aerogel is described in U. S. Patent No. 2,093,454, to Samuel S. Kistler and comprises the heating of a gel under such conditions that the liquid is removed therefrom at a temperature at which the surface tension of the liquid is very low. In the case of liquids having a high critical temperature or an appreciable surface tension at atmospheric conditions of temperature and pressure, this condition is readily met by heating in an autoclave. A silica aerogel having an apparent density of less than 15% of the actual density may be made by displacing the water of a silica hydro-gel with ethyl alcohol and transferring the resultant alco-gel to an autoclave where it is heated to about the critical temperature of the alcohol while maintaining the pressure slightly in excess of the critical. The alcohol vapor is then released at the critical temperature and the mass within the autoclave is found to consist of the solid phase of the gel in substantially the same condition as that of the original gel at the time of gelation. When a gel is dried by merely removing the continuous phase at its atmospheric boiling point, the capillary forces of the liquid as it recedes in the pores of the gel serve to contract the solid gel structure to a large degree. At the critical temperature, the surface tension of the liquid disappears and the liquid of the continuous phase may be evaporated without damage to the gel.

If desired, a gel may be made up which contains as the continuous phase a liquid of low surface tension at the atmospheric boiling point. Some petroleum fractions are suitable for this purpose. It is then unnecessary to remove the continuous phase in an autoclave since the low surface tension of the liquid will have little appreciable effect upon the gel structure.

No matter what the process of preparation of the silica aerogel, it will be found that all substances of this class are lighter than silica gels known prior to the Kistler invention and that they possess an extremely large percentage of voids in the form of pores too small to be detected under a microscope.

The physical properties of the silica aerogels are capable of wide variation. The density of the gel structure may be varied by control of the concentration of the material forming the solid phase thereof. Since the gel structure is maintained substantially unaffected from the time of formation of the original gel to the finished silica aerogel, the concentration of solid phase is practically unchanged on removal of liquid by the Kistler process. Silica aerogels may be prepared in which the percent of voids ranges from the usual 30 to 50% found in commercial silica gels to 99% or even more under carefully controlled conditions. In accordance with the present invention it is desirable to employ a silica aerogel having a high percentage of voids.

The following specific example will serve to illustrate the invention, but it is to be understood that the present invention is not limited thereto.

A master batch is made of 40 parts of unmilled pale crepe rubber, 10 parts of silica aerogel prepared as above, and 0.2 part of Dupont's GD Blue (the parts are by weight). Milling is effected in the customary manner until the components are adequately mixed and 60 parts by weight of unmilled pale crepe rubber are added and milling continued until the components are homogeneously dispersed. The composition is creped in the usual manner, to give the desired thickness and surface characteristics. It is preferable to mill at a relatively low temperature (warm rather than hot), also the milling steps should not be continued longer than is necessary. These precautions should be taken because the advantages resulting from the incorporation of silica aerogel can be largely negatived if unnecessarily hot and prolonged milling is performed. It should be understood, of course, that the presence of silica aerogel even in such cases gives a more desirable product than if the silica aerogel had been omitted.

The preparation of a master batch, as described in the example, while not necessary, is desirable in order to facilitate thorough mixing of the silica aerogel and the coloring matter with the rubber. If all the ingredients are milled together at once, without first making a master batch, the total milling time required for uniform dispersion is greater than when using the master batch procedure, as is well known in conventional rubber-milling practice, due to the fact that the amounts of silica aerogel and coloring matter are relatively small as compared with the amount of rubber.

The amount of silica aerogel used, in proportion to the rubber, may vary within fairly wide limits. A reasonable working range is between about 2% and about 10%. Less than the former amount has too little effect upon the characteristics of the product to be of any real significance. More than 10%, which is the proportion in the example given above, tends to increase the cost of the product beyond that at which it can be used and sold economically. However, it is possible to incorporate more than 10% of silica aerogel, but the products so prepared become harder, stiffer, and more inelastic as this proportion is increased, and hence are less desirable for the uses intended for them. It is possible to overcome this increased hardness, stiffness, etc., by increasing the time and/or temperature of milling, but such procedure is not only wasteful of silica aerogel but also tends to affect the product deleteriously in other ways.

It is therefore evident that the present invention provides two ways by which the characteristics of the product can be controlled; first, controlling the amount of silica aerogel used, and second, controlling the amount (time and temperature) of milling. By proper regulation of these two factors, the characteristics of the final product may be made substantially the same as those of unmilled unvulcanized crepe rubber; or the final product may be made either more or less adhesive, hard, stiff, and stretch-, wear-, and indentation-resistant than the unmilled rubber.

While the product of this invention is intended primarily for use as soling, it is not limited thereto, and may be used for other purposes as desired.

What is claimed is:

A process of producing unvulcanized crepe rubber soling having substantially the characteristics of unmilled unvulcanized crepe rubber which comprises preparing a master batch from unmilled crepe rubber and silica aerogel having an apparent density less than 15% of the actual density, adding unmilled unvulcanized crepe rubber in such amount that the composition contains from substantially 2% to 10% of the aerogel and completing the milling step at a relatively low temperature and in the minimum time required to attain a homogeneous composition.

MORRIS OMANSKY.